(12) United States Patent
Laplace et al.

(10) Patent No.: US 10,795,813 B2
(45) Date of Patent: Oct. 6, 2020

(54) IMPLEMENTING PER-PROCESSOR MEMORY AREAS WITH NON-PREEMPTIBLE OPERATIONS USING VIRTUAL ALIASES

(71) Applicant: VMware, Inc., Palo Alto, CA (US)

(72) Inventors: Cyprien Laplace, Cambridge, MA (US); Harvey Tuch, Cambridge, MA (US); Andrei Warkentin, North Andover, MA (US); Adrian Drzewiecki, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/420,549

(22) Filed: May 23, 2019

(65) Prior Publication Data

US 2019/0286558 A1    Sep. 19, 2019

Related U.S. Application Data

(62) Division of application No. 14/838,541, filed on Aug. 28, 2015, now Pat. No. 10,331,556.

(51) Int. Cl.
*G06F 12/02* (2006.01)
*G06F 12/04* (2006.01)
*G06F 12/06* (2006.01)
*G06F 9/455* (2018.01)

(52) U.S. Cl.
CPC .......... *G06F 12/0292* (2013.01); *G06F 9/455* (2013.01); *G06F 12/04* (2013.01); *G06F 12/06* (2013.01); *G06F 2212/151* (2013.01); *G06F 2212/656* (2013.01)

(58) Field of Classification Search
None
See application file for complete search history.

(56) References Cited

U.S. PATENT DOCUMENTS

2014/0181830 A1    6/2014   Naik et al.

*Primary Examiner* — Michael Alsip
(74) *Attorney, Agent, or Firm* — Patterson + Sheridan, LLP

(57) ABSTRACT

A computer system provides a mechanism for assuring a safe, non-preemptible access to a private data area (PRDA) belonging to a CPU. PRDA accesses generally include obtaining an address of a PRDA and performing operations on the PRDA using the obtained address. Safe, non-preemptible access to a PRDA generally ensures that a context accesses the PRDA of the CPU on which the context is executing, but not the PRDA of another CPU. While a context executes on a first CPU, the context obtains the address of the PRDA. After the context is migrated to a second CPU, the context performs one or more operations on the PRDA belonging to the second CPU using the address obtained while the context executed on the first CPU. In another embodiment, preemption and possible migration of a context from one CPU to another CPU is delayed while a context executes non-preemptible code.

20 Claims, 7 Drawing Sheets

IMPLEMENTING PER-PROCESSOR MEMORY AREAS WITH NON-PREEMPTIBLE OPERATIONS USING VIRTUAL ALIASES

CROSS-REFERENCE TO RELATED APPLICATIONS

This application is a divisional of copending U.S. application Ser. No. 14/838,541, titled "Implementing Per-Processor Memory Areas with Non-Preemptible Operations Using Virtual Aliases," filed on Aug. 28, 2015, the entire contents of which is hereby incorporated by reference herein.

BACKGROUND

In multi-processor systems (whether multi-chip or multi-core on a single chip), processors (i.e., physical CPUs or CPU cores, or logical CPUs where simultaneous multi-threading is supported on a processor) generally have memory-mapped data areas, known as per-CPU private data areas (PRDAs). Generally, access to variables in a PRDA should be fast and should not be preempted (i.e., interrupted and resumed at a later point in time), since a system software (e.g., a hypervisor) accesses data in the PRDA frequently on performance critical paths.

Some processor architectures have instructions that are inherently atomic when accessing a PRDA to read and/or modify the PRDA. Software written for processor architectures that support atomic instructions generally are written assuming that PRDA accesses will not be interrupted. When software is ported from an architecture that supports these atomic instructions to an architecture that does not support such instructions, the assumption that PRDA accesses will not be interrupted may no longer be true.

SUMMARY

Safe, non-preemptible access to a private data area (PRDA) generally ensures that a context accesses the PRDA of the CPU on which the context is executing, but not the PRDA of another CPU. One or more embodiments implement a computer system in which a context executing on a CPU is assured safe, non-preemptible access to a private data area (PRDA) of the CPU by using a common address to access a PRDA regardless of the CPU on which a context executes. Generally, an access to a PRDA includes obtaining an address of the PRDA and performing one or more operations on the PRDA using the obtained address. According to embodiments, a context performs an access to a PRDA while the context executes on a CPU. While the context executes on the first CPU, the context obtains the address of the PRDA. The context is migrated to a second CPU, and while the context executes on a second CPU, the context performs one or more operations on a PRDA using the obtained address. Any operation on a PRDA using the obtained address after the context is migrated to the second CPU is an access of a PRDA belonging to the second CPU, but not an access of a PRDA belonging to the first CPU.

Safe execution of non-preemptible code, such as a PRDA access, may be ensured by blocking preemption until the non-preemptible code finishes executing. One or more embodiments implement a computer system in which safe execution of non-preemptible code is assured. According to embodiments, a context is assigned to execute on a CPU. An exception is received, and while processing the exception, it is determined whether the context is currently executing non-preemptible code. If the context is currently executing non-preemptible code, a flag is set to indicate a pending preemption. The context completes the execution of the non-preemptible code and determines whether or not a preemption is pending (i.e., based on the value of a flag used to indicate that a preemption is pending). If a preemption is pending, a preemption and migration of the context to a different CPU is allowed.

DETAILED DESCRIPTION

Figure 1:
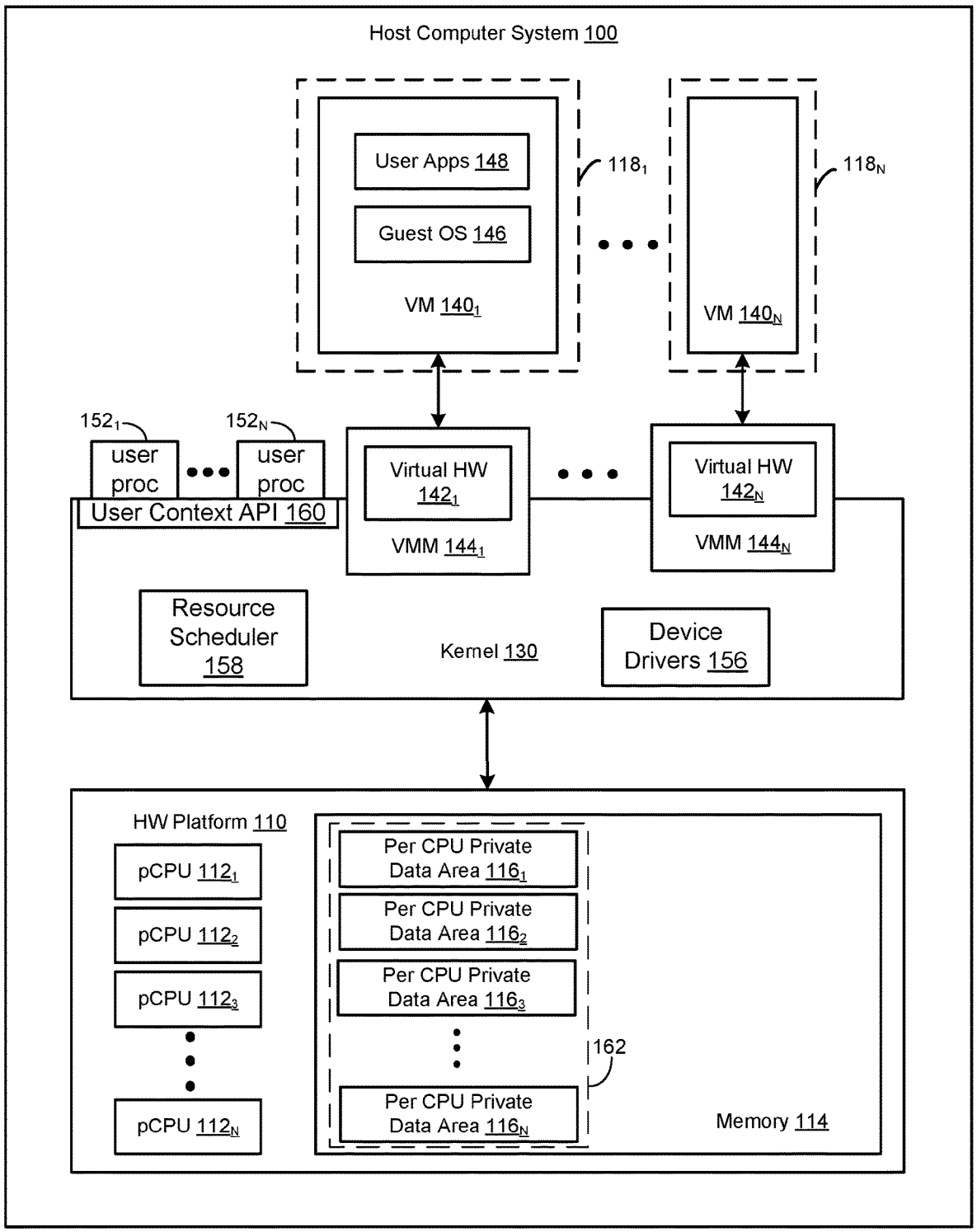
FIG. 1 is a block diagram of a host computer system, according to one or more embodiments.

FIG. 1 is a block diagram of a host computer system 100, according to one or more embodiments. Host computer system 100 may take the form of a desktop, laptop, mobile, tablet, or server grade hardware platform 110. Hardware platform 110 includes one or more physical/logical central processing units (pCPUs) $112_1$-$112_N$, host physical memory 114, and other standard hardware components such as network interface controllers (not shown) that connect host computer system 100 to a network. In the discussion that follows a pCPU refers to either a physical CPU core or a logical core, if the physical core supports simultaneous multithreading (e.g., hyper-threading).

Host physical memory 114 includes a plurality of locations accessible through a physical address. Virtual memory may be configured on a per-process basis to provide a virtual address space usable by a process to access locations in host physical memory 114. Mappings between a virtual address and physical address may be stored in a translation lookaside buffer (TLB) at each pCPU to speed up address look-ups.

As illustrated, host physical memory 114 includes a section 162 of physical memory containing per-pCPU private data areas $116_1$-$116_N$. Each of pCPUs $112_1$-$112_N$ is associated with a per-pCPU private data area (PRDA) $116_1$-$116_N$. Virtual memory may be configured on a per-process or per-pCPU basis and provide a mapping between a virtual address usable by a process and a physical address space in host physical memory 114. pCPUs 116 may include a single cache or multiple levels of caches in which the pCPU searches smaller, faster caches (e.g., level 1 cache) before searching larger, slower caches (e.g., level 2 or level 3 caches) for data. Typically, a level 1 cache may store the most recently used data and instructions, while higher level caches store other data and instructions that have been accessed or used by the processor in previous operations.

Virtual memory may be configured as a set of virtual memory pages, with one or more page tables associating a virtual memory address with a physical location in memory. In some cases, virtual memory may be configured with multiple levels of page tables arranged in a hierarchy. Higher level page tables generally include entries with mappings of virtual memory addresses to physical memory addresses, in addition to references to lower level page tables, and lower level page tables generally include mappings to the user-accessible and kernel-addressable portions of the virtual address space.

During regular operations, contexts running on a pCPU 112 access the PRDA 116 belonging to that pCPU (i.e., if a context is executing on pCPU $112_1$, the program accesses the corresponding PRDA $116_1$). If a context is migrated from one pCPU 112 to a second pCPU 112, the context should access the PRDA 116 corresponding to the second pCPU, but not the PRDA corresponding to the first pCPU.

Kernel 130 may be an operating system kernel or a hypervisor component. In one embodiment, kernel 130 is installed on top of hardware platform 110. Kernel 130 provides operating system functionality (e.g., process creation and control, file system, process threads, etc.) as well as pCPU scheduling and memory scheduling across multiple virtual machine (VM) execution spaces $118_1$-$118_N$. Within each VM execution space $118_1$-$118_N$, a VM process is executed to instantiate corresponding VMs $140_1$-$140_N$. Virtual machine monitors (VMM) $144_1$-$144_N$ implement the virtual system support needed to coordinate operations between kernel 130 and the respective VMs $140_1$-$140_N$.

As illustrated, kernel 130 includes device drivers 156 and a resource scheduler 158. Device drivers 156 provide an interface that allows user processes 152, virtual machine monitors 144, and kernel 130 to interact with and/or command operation of devices on or connected to hardware platform 110 to perform device functions. For example, device drivers 156 allow user processes 152, virtual machine monitors 144, and other programs running on hardware platform 110 to perform network communications via a network interface card, receive input from input devices (e.g., keyboards, mice, etc.), and interact with other hardware present on or connected to hardware platform 110.

Resource scheduler 158 manages the hardware resources on hardware platform 110 and determines the resources assigned to various processes and/or contexts. Generally, resource scheduler 158 assigns different hardware resources to different contexts to, inter alia, balance workloads across different components (e.g., pCPUs $112_1$-$112_N$) in the system. As described in further detail below, resource scheduler 158 assigns contexts to pCPUs 112 and migrates various contexts (e.g., user processes 152 executing in the user context or virtual machine monitors 144 executing in the monitor context) among pCPUs 112. Additionally, resource scheduler 158 monitors resource utilization on hardware platform 110 and determines if and when to migrate contexts among different pCPUs.

As shown, each VMM $144_1$-$144_N$ manages a corresponding virtual hardware platform (i.e., virtual hardware platforms $142_1$-$142_N$) that includes abstracted hardware such as virtual CPUs (vCPUs) and guest physical memory. Each virtual hardware platform 142 supports the installation of a guest operating system (OS) 146. In each instance, guest OS 146 provides user applications 148 running in the virtual machine an interface to the virtual hardware platform of the virtual machine.

In a virtualized system, a space in host physical memory 114 is allocated to each VMM $144_1$-$144_N$. Within a VMM 144, the allocated space in host physical memory 114 is visible to a guest OS 146 as a guest physical memory space. OS 146 generally presents a virtual memory space to user applications 148. The virtual memory space is mapped to the guest physical memory space, which in turn is mapped to the space in host physical memory 114 that is allocated to a VMM 144.

As shown, each user process $152_1$-$152_N$ (e.g., user applications) uses resources on hardware platform 110 through user context API 160. User context API 160 provides an interface for user process 152, operating in the user context, to perform operations using resources assigned to the user process by resource scheduler 158.

Execution contexts, which are schedulable entities similar to threads or processes, include a system context, a user context, and a monitor context among others. These execution contexts may be executed on and migrated among each of the pCPUs $112_1$-$112_N$. A system context is a context executed by the kernel 130. A monitor context is a context executed by a virtual machine monitor 144. A user context is a user process 152, which runs directly on kernel 130. A system context may not own its own page table. Rather, a system context page table may be present on each pCPU, and any system context executing on a pCPU can use the system context page table for that pCPU. In contrast, user contexts and monitor contexts may maintain their own page tables, which may be updated as the contexts are migrated between different pCPUs.

An example host computer system 100 includes an ARM® Cortex-A57 (based on the ARMv8 architecture) for pCPUs 112. ARMv8 CPUs, including ARM® Cortex-A57, are commercially available from licensees of ARM Holdings of Cambridge, United Kingdom. It should be recognized that the techniques described herein are illustrative rather than restrictive.

It should be recognized that the various terms, layers and categorizations used to describe the virtualization components in FIG. 1 may be referred to differently without departing from their functionality or the spirit or scope of the invention. For example, virtual hardware platforms $142_1$-$142_N$ may be considered to be part of virtual machine monitors (VMM) $144_1$-$144_N$. Alternatively, virtual hardware platforms $142_1$-$142_N$ may be considered to be separate (e.g., as a component of its corresponding virtual machine since such platforms include the hardware emulation components for the virtual machine) from VMMs $144_1$-$144_N$, and VMMs $144_1$-$144_N$ may be considered to be separate from kernel 130. One example of kernel 130 that may be used is the kernel that is included as a component of VMware® vSphere™, which is commercially available from VMware, Inc. of Palo Alto, Calif. It should further be recognized that other virtualized computer systems are contemplated, such as hosted virtual machine systems, where the hypervisor is implemented in conjunction with a host operating system.

Figure 2:
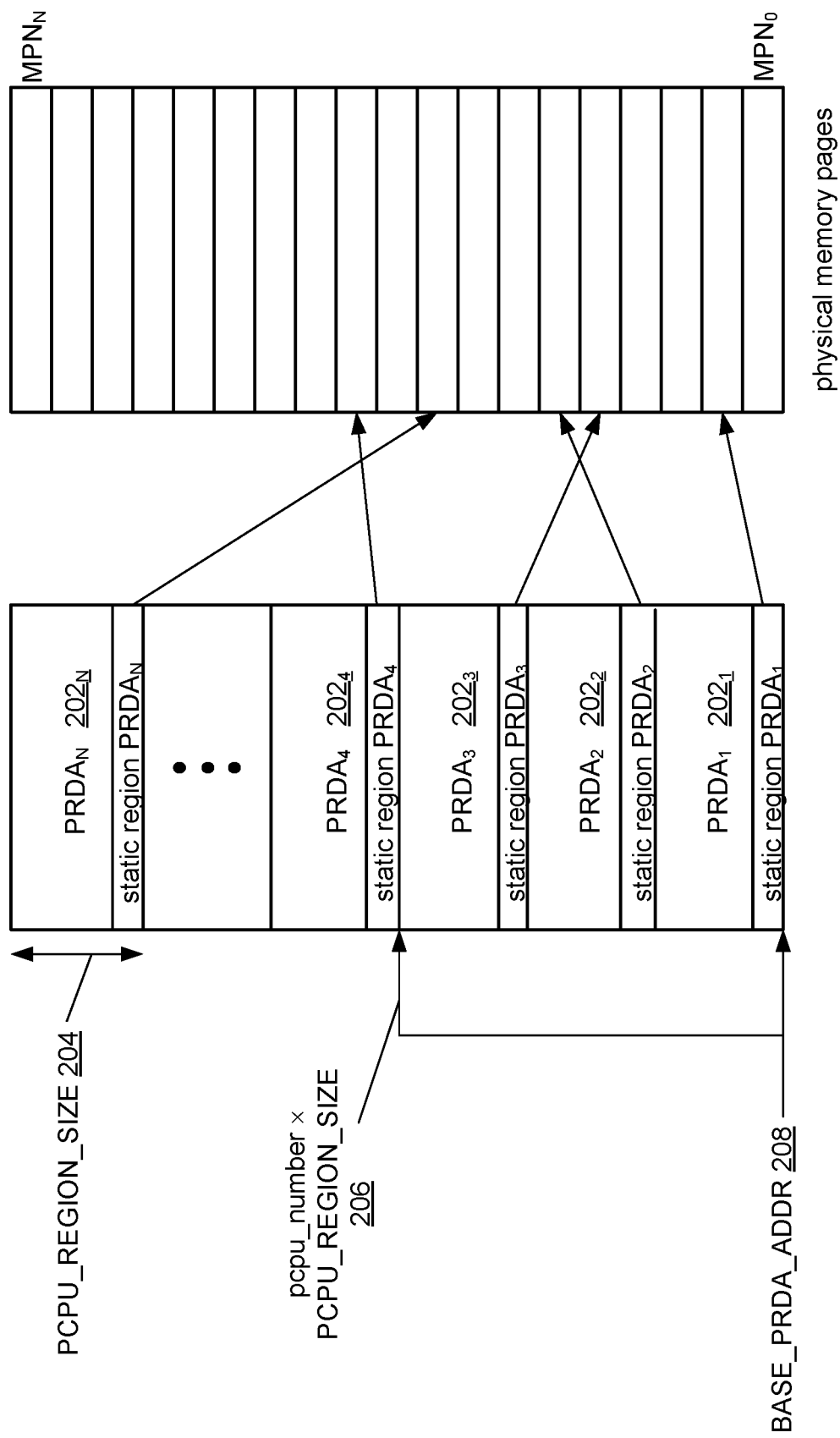
FIG. 2 illustrates the use of a virtual address to access per-CPU private data areas (PRDAs), according to an embodiment.

FIG. 2 illustrates the use of a virtual address to access per-CPU private data areas (PRDAs) 202, according to an embodiment. Each PRDA 202 in virtual memory is mapped to one or more machine pages in physical memory in which a corresponding PRDA 116 (in FIG. 1) is located. That is, PRDA $202_1$ in virtual memory is mapped to PRDA $116_1$ in physical memory and is associated with a first pCPU (e.g., pCPU $112_1$), and PRDA $202_N$ is mapped to an $N^{th}$ PRDA in physical memory (e.g., PRDA $116_N$) and associated with an Nth pCPU (e.g., pCPU $112_N$). The PRDA for each pCPU may include a static PRDA region and a dynamic PRDA region.

As illustrated, in the virtual address space, each PRDA 202 in the virtual address space has a size of PRDA_RE-GION_SIZE 204. To access the starting location of the PRDA 202 for a specific pCPU 112, an offset is added to BASE_PRDA_ADDRESS 208. In an aspect, the offset may be the product 206 of the pCPU number and PRDA_RE-GION_SIZE 204. That is, for an $n^{th}$ pCPU, the offset may be n*PRDA_REGION_SIZE.

Figure 3:
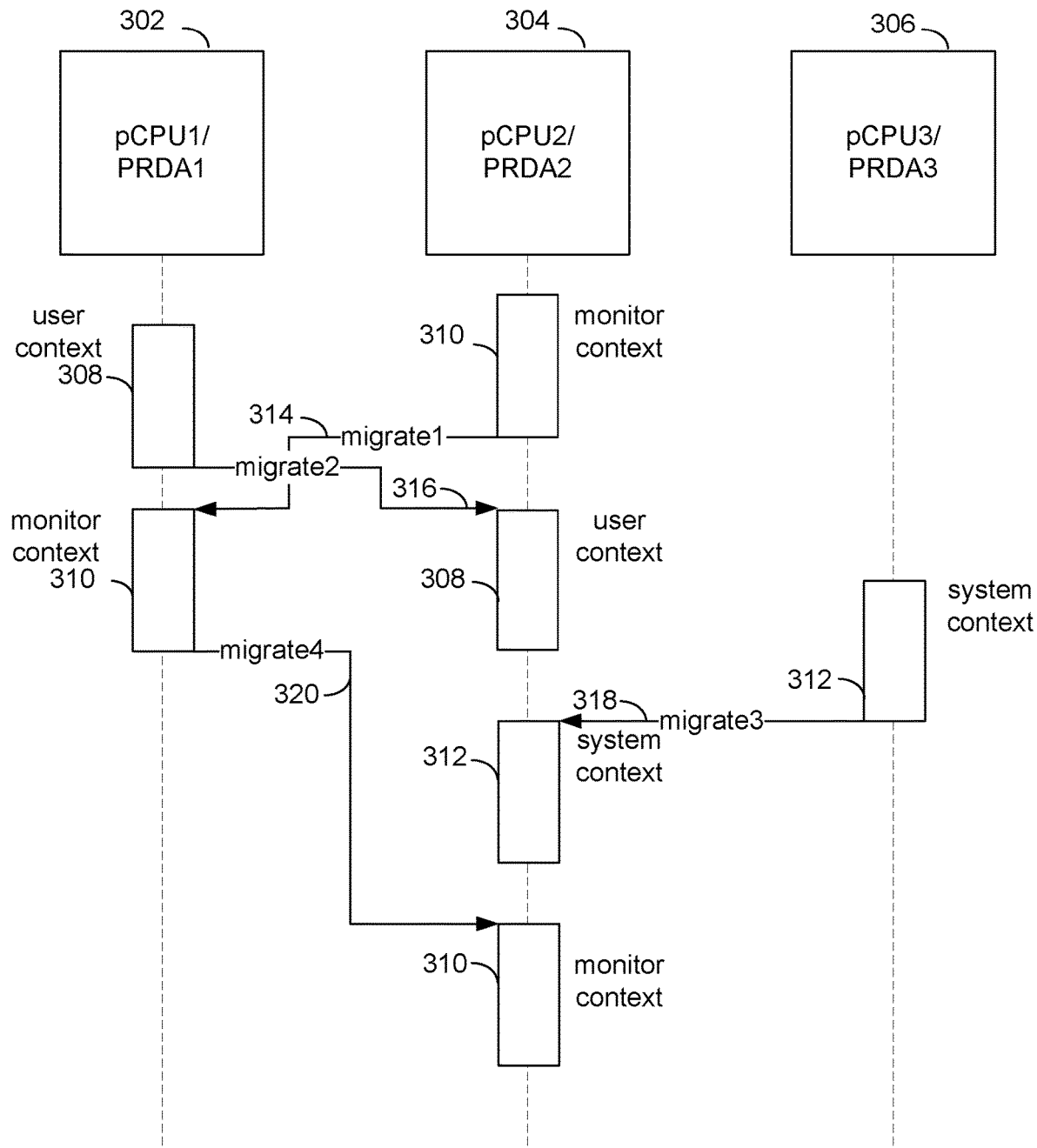
FIG. 3 illustrates an example of different execution contexts migrating onto a CPU, according to an embodiment.

FIG. 3 illustrates an example of different execution contexts migrating onto a pCPU, according to an embodiment. As illustrated, three pCPUs 302, 304, and 306 are provided in the computer system. Further as illustrated, user context 308 is initially scheduled on pCPU1 302, monitor context 310 is initially scheduled on pCPU2 304, and system context 312 is initially scheduled on pCPU3 306. At various points in time, four migrations occur. The first migration 314 migrates monitor context 310 from pCPU2 304 to pCPU1 302. A second migration 316 migrates user context 308 from pCPU1 302 to pCPU2 304. A third migration 318 migrates system context 312 from pCPU3 306 to pCPU2 304. Finally, a fourth migration 320 migrates monitor context 310 from pCPU1 302 to pCPU2 304. Thus, pCPU2 304 executes code first in monitor context 310, then in user context 308, then in system context 312 and then again in monitor context 310. For example, while user context 308 is scheduled on pCPU1, user context 308 accesses PRDA1 belonging to pCPU1. After the second migration 316 migrates user context 308 to pCPU2, user context 308 accesses PRDA2 belonging to pCPU2, but not PRDA1 belonging to pCPU1 (i.e., a context accesses the PRDA belonging to the pCPU on which the context is currently assigned). Similarly, while monitor context 310 is scheduled on pCPU2, monitor context 310 accesses PRDA2 belonging to pCPU2, and after the first migration 314, which migrates monitor context 310 to pCPU1, monitor context 310 accesses PRDA1 belonging to pCPU1, but not PRDA2 belonging to pCPU2.

Preemption and possible migration of execution contexts on a pCPU while the pCPU is accessing its PRDA does not pose a problem when the kernel runs on the x86 architecture. The GS data segment register in the x86 processor can be used to point to the base of the PRDA for the pCPU to which the GS register belongs. When the pCPU makes an access to the PRDA, it can use a single instruction, which is inherently non-preemptible in the x86 architecture. For example, the x86 instruction, mov % rax, % gs:offset writes data from the ax register to the pCPU's PRDA. Additionally, a single read-modify-write instruction, add % rax, % gs:offset updates a location in the pCPU's PRDA using the contents of the ax register.

Other architectures, such as the ARM® architecture, do not have a single register in which the base location of a PRDA is stored such that a register-index load/store operation can be used to atomically access the PRDA. Thus, accessing a location in a PRDA or modifying data in the location of the PRDA requires separate discrete instructions between which a preemption and possible migration of contexts, such as the move of user context 308 from pCPU 1 to pCPU 2 in FIG. 3, may occur. If the preemption results in a context being migrated from a first pCPU to a second pCPU during the PRDA access, a race condition exists in which the migration can sometimes result in the context accessing and/or modifying data in the PRDA belonging to the first pCPU while the context is running on the second pCPU.

To ensure that a context accesses the PRDA belonging to the particular pCPU on which the context is scheduled, the system can disable interrupts while the pCPU accesses its PRDA. While disabling interrupts prevents preemption of any critical code area, disabling interrupts can potentially result in significant performance overhead and can reduce the performance benefits of preemption and migration of resources. Thus, what is needed is a way to assure safe access to per-pCPU PRDAs in architectures that do not support single, non-preemptible instructions to read, modify, and write data to memory.

Figure 4:
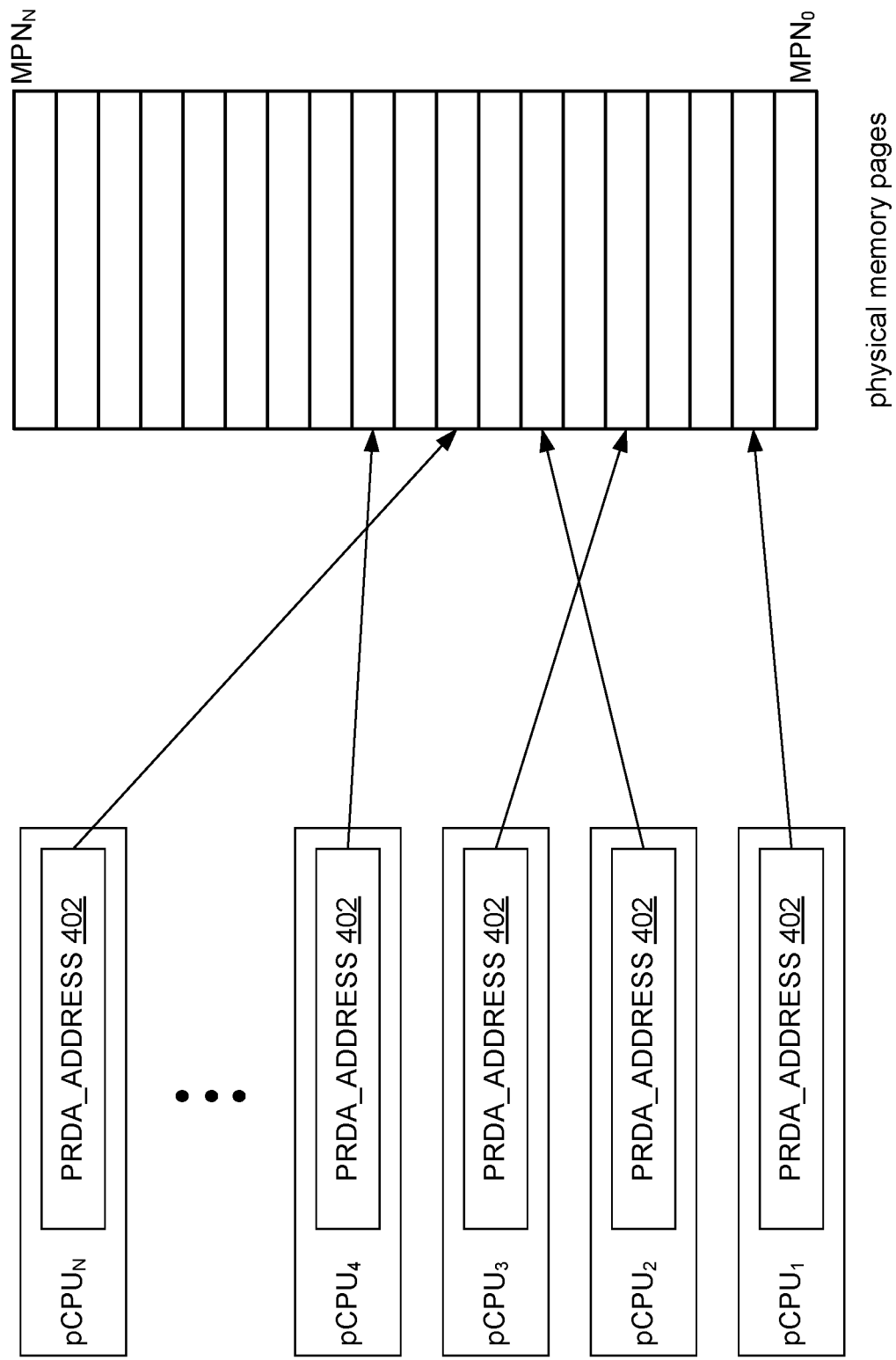
FIG. 4 illustrates the use of a designated virtual address to access a per-CPU PRDA, according to an embodiment.

FIG. 4 illustrates the use of a designated virtual address to access a per-pCPU PRDA, according to an embodiment. As illustrated, each pCPU maps a virtual address, PRDA_AD-DRESS 402, to the PRDA belonging to the pCPU. The mapping may be stored in a TLB belonging to a pCPU. In an embodiment, the base physical address of the PRDA belonging to a pCPU may be stored in a register (e.g., on ARM processors, the thread local storage register), and a mapping is generated in a page table between the virtual address, PRDA_ADDRESS 402, and the base physical address of the PRDA for a given pCPU. In the figure, for example, after pCPU3 sets up its page table base pointer and the physical address, if needed, pCPU3 can use the PRDA_ADDRESS 402 to access the physical pages corresponding to the PRDA3 belonging to pCPU3. Thus, each pCPU can access its own PRDA via PRDA_ADDRESS, regardless of the context in which the pCPU runs.

Figure 5A:
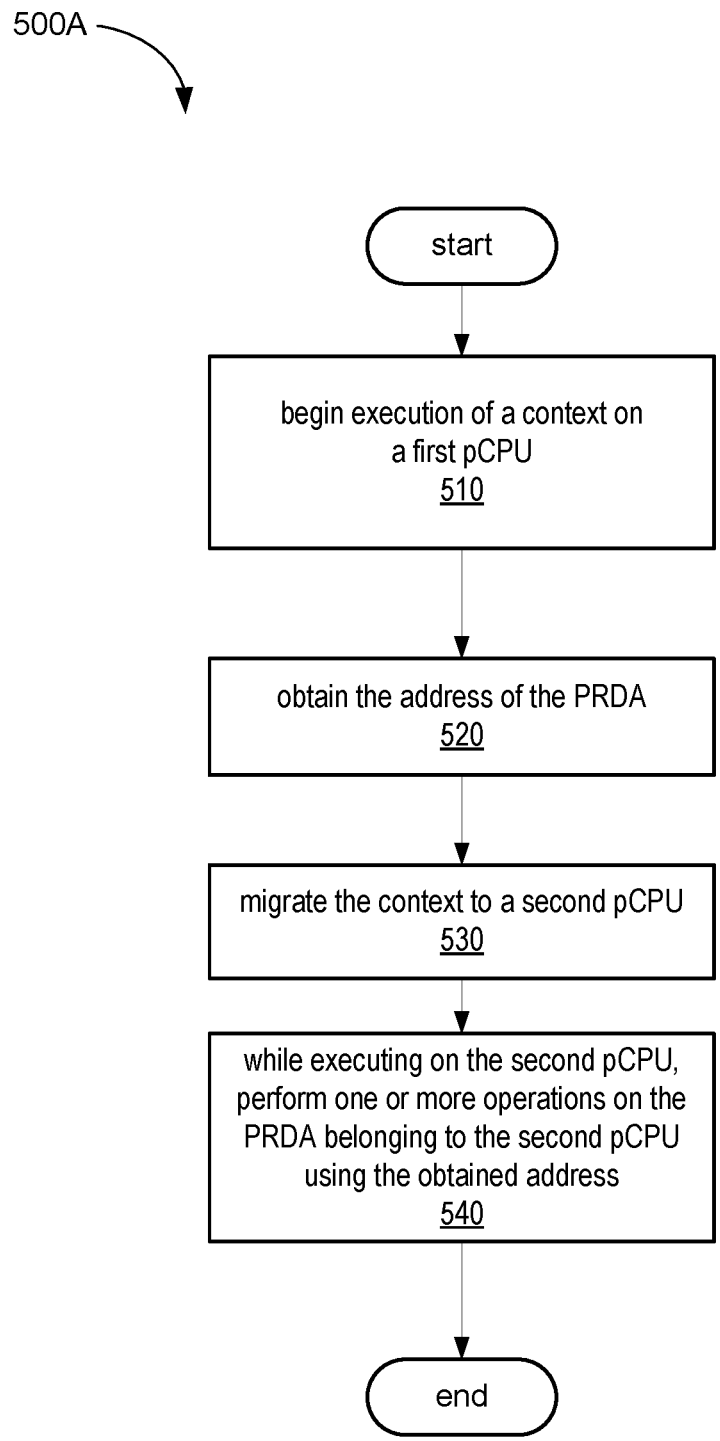
FIG. 5A is a flow diagram illustrating an example method for assuring safe access to a PRDA when a context is migrated from a first CPU to a second CPU between obtaining an address of a PRDA and performing an operation on a PRDA, according to an embodiment.

FIG. 5A is a flow diagram illustrating an example method 500 for assuring safe access to a PRDA when a context is migrated to a different pCPU between obtaining an address and performing operations on a PRDA, according to an embodiment. Method 500A begins at step 510, where a context begins execution on a first pCPU.

At step 520, while the context executes on the first pCPU, the context obtains the address of the PRDA. The PRDA for a pCPU is accessible through a designated virtual address that is a constant across all of the pCPUs in a system (i.e., a global address). The virtual address is mapped to different physical addresses for different pCPUs (e.g., in a page table for each pCPU mapping the virtual address to the physical address of the PRDA associated with the pCPU). Thus, a context can use the same virtual address, PRDA_AD-DRESS, to access a PRDA even if and when the context is migrated from one pCPU to another pCPU. That is, while the context is assigned to the first pCPU, the context accesses the PRDA belonging to the first pCPU, and when the context is migrated to a second pCPU, the context would access the PRDA belonging to the second pCPU instead.

At step 530, the scheduler migrates the context to a second pCPU. At step 540, the context completes access of the PRDA using the obtained address.

In one example, the context accesses a PRDA using two discrete instructions. In this example, a pCPU based on the ARMv8 architecture performs the following code sequence:

```
mov x0, #PRDA_ADDRESS
ldr x1, [x0, offset]
``` to access a PRDA. The move (mov) instruction loads the virtual address, PRDA_ADDRESS, into the x0 register of the pCPU and the load register instruction (ldr) loads the x1 register with the contents of a location in the PRDA specified by an offset added to the PRDA_ADDRESS. Thus, even if the context executes the move instruction on the first pCPU, which is guaranteed to complete on the first pCPU, and then the load register instruction on a second pCPU, which is guaranteed to complete on the second pCPU, the code sequence accesses only the PRDA belonging to the pCPU executing the code.

Figure 5B:
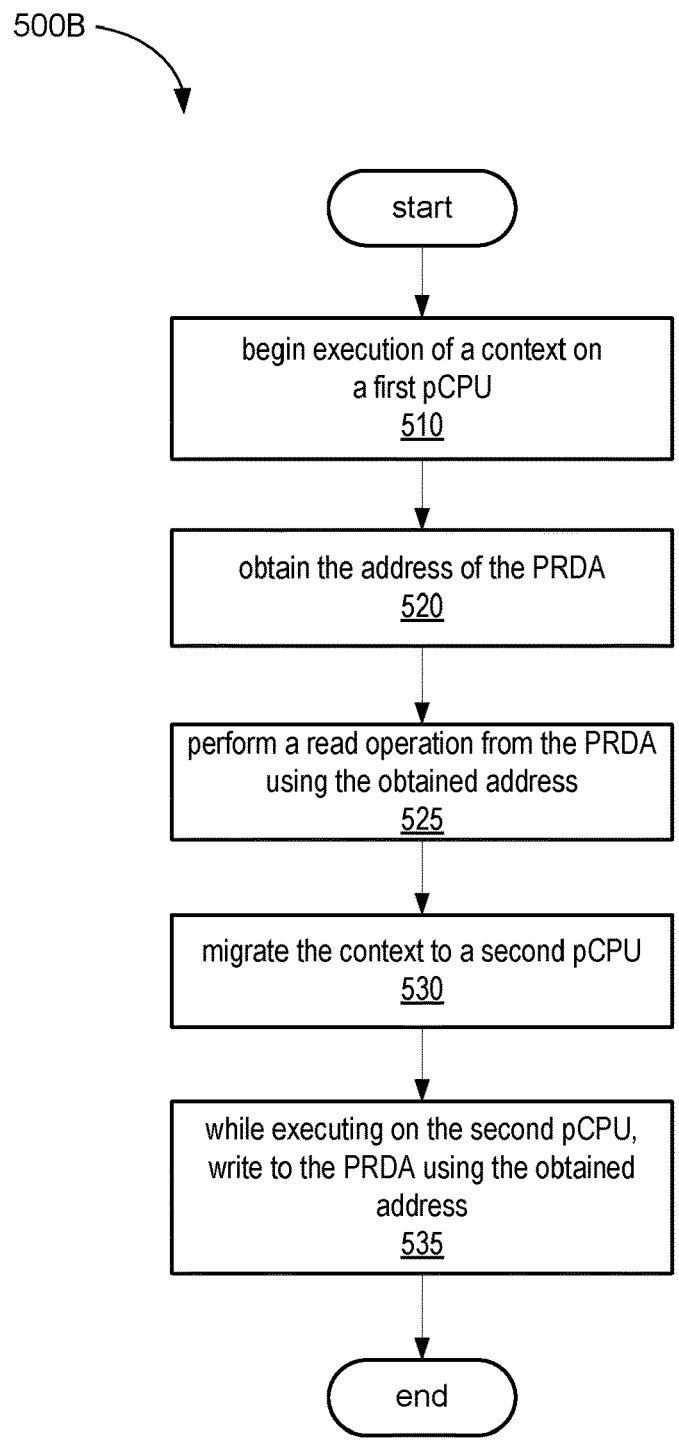
FIG. 5B is a flow diagram illustrating an example method for assuring safe access to a PRDA when a context is migrated from a first CPU to a second CPU between reading an entry in a PRDA and writing the entry, according to an embodiment.

FIG. 5B is a flow diagram illustrating an example method 500B for assuring safe access to a PRDA when a context is migrated to a different pCPU between reading from a PRDA and writing to a PRDA, according to an embodiment. Method 500B begins at step 510, where a context begins execution on a first pCPU.

At step 520, while the context executes on the first pCPU, the context obtains the address of the PRDA, as described above. Method 500B then proceeds to step 525, where the context performs a read operation from the PRDA using the obtained address. At step 530, the context is migrated to a second pCPU. After the context is migrated to a second pCPU, method 500B proceeds to step 535, where the context performs a write operation to the PRDA belonging to the second pCPU using the obtained address.

An example code sequence that performs a read and write, such as those depicted in FIG. 5B, is set forth below. In this example, the context performs the following code sequence on a pCPU based on the ARMv8 architecture, where each instruction is guaranteed to complete on the pCPU on which it executes:

```
1. mov x0, #PRDA_ADDRESS
2. add x0, x0, offset
3. label: ldxr x1, [x0]
4. add x1, x1 #1
5. stxr w2, x1, [x0]
6. cbnz w2, label
```

In step 1, the pCPU moves the designated virtual address PRDA_ADDRESS into the x0 register of the pCPU. In step 2, the pCPU updates the contents of register x0 with an offset added to the register's original contents. In step 3, the pCPU loads the x1 register with the contents of the location in the PRDA addressed by the contents of x0. In step 4, the processor updates the contents of register x1 (i.e., it adds a constant to the value in the register). In step 5, the pCPU stores the contents of x1 back to the location in the PRDA addressed by the x0 register and records a status of the store in register w2. In step 6, the processor tests the status in the w2 register with the cbnz instruction to determine if the store in step 5 was successful. If not, the pCPU performs the steps 3, 4, 5 again, until the store is successful. The ldxr and stxr instructions are typically used to ensure that multiple threads do not interfere with each other; however, as used herein, the ldxr and stxr instructions can be used to detect when a single context migrates between pCPUs. The above read-modify-write operation succeeds when the ldxr and the stxr target the same physical address, which was obtained from the translation of the PRDA_ADDRESS, in accordance with the ARM architecture. If a preemption and migration occurs between the ldxr and stxr instructions, the two instructions will not refer to the same physical address, and the stxr instruction will fail (i.e., report a failed completion in the w2 register). Thus, if a preemption and migration occurs between the ldxr and stxr instructions (i.e., the context is migrated to a different pCPU between the ldxr and stxr instructions), the code assures safe access because it repeats steps 3 through 6 until the stxr instruction reports a successful completion in the w2 register.

A pCPU uses a page table to access the physical per-CPU data area using the virtual address PRDA_ADDRESS. When a system context is migrated to a pCPU as in third migration 318 in FIG. 3, no change to the page table itself is needed because the system context uses a page table that already has the correct mapping for the pCPU's PRDA present at PRDA_ADDRESS. That is, because a system context does not own a page table, the system context uses the target pCPU's page table for the mapping between PRDA_ADDRESS and the physical address of the PRDA belonging to the target pCPU. On the other hand, when a user context is migrated, as in the second migration 316 in FIG. 3, or the monitor context is migrated, as in the fourth migration 320 in FIG. 3, to the pCPU, the page table mapping is updated at the virtual address PRDA_ADDRESS. The physical address of the PRDA for a pCPU 112 is maintained in a local register (e.g., on an ARM64® processor, in a thread local storage register). In one embodiment, the physical address of the PRDA 116 for a pCPU 112 is set at boot time. Based on the physical address of the PRDA 116, the designated entry at PRDA_ADDRESS in the page table is thus updated when a user or monitor context is migrated to the pCPU.

Because the previously loaded translation look-aside buffer (TLB) entry for a PRDA for a given pCPU will have only pointed to the correct PRDA address for the pCPU, the TLB for the pCPU need not be invalidated. However, the data cache for a pCPU on which a migration has occurred should be cleaned out to the point of unification with a page table walker such that the page table walker and the data cache see the same copy of a memory location after the migration. In one embodiment, the point of unification is the level 2 cache, when the pCPU has a level 1 cache and a TLB for caching page table entries, and the page table walker is coherent with the level 2 cache.

In some embodiments, multiple user contexts coexist as a group, or a "cartel." User contexts in a cartel may share page tables for certain lower level page tables. For example, a cartel may share the page tables covering the user-accessible portions of the address space in memory 114. Regardless of the pCPU on which a user context in a cartel is running, the PRDA mapping is specific to a particular user context in the cartel. Thus, code executing on a particular pCPU in one user context in the cartel is not able to corrupt the PRDA of another user in the cartel if another user context is migrated to the pCPU.

Figure 6:
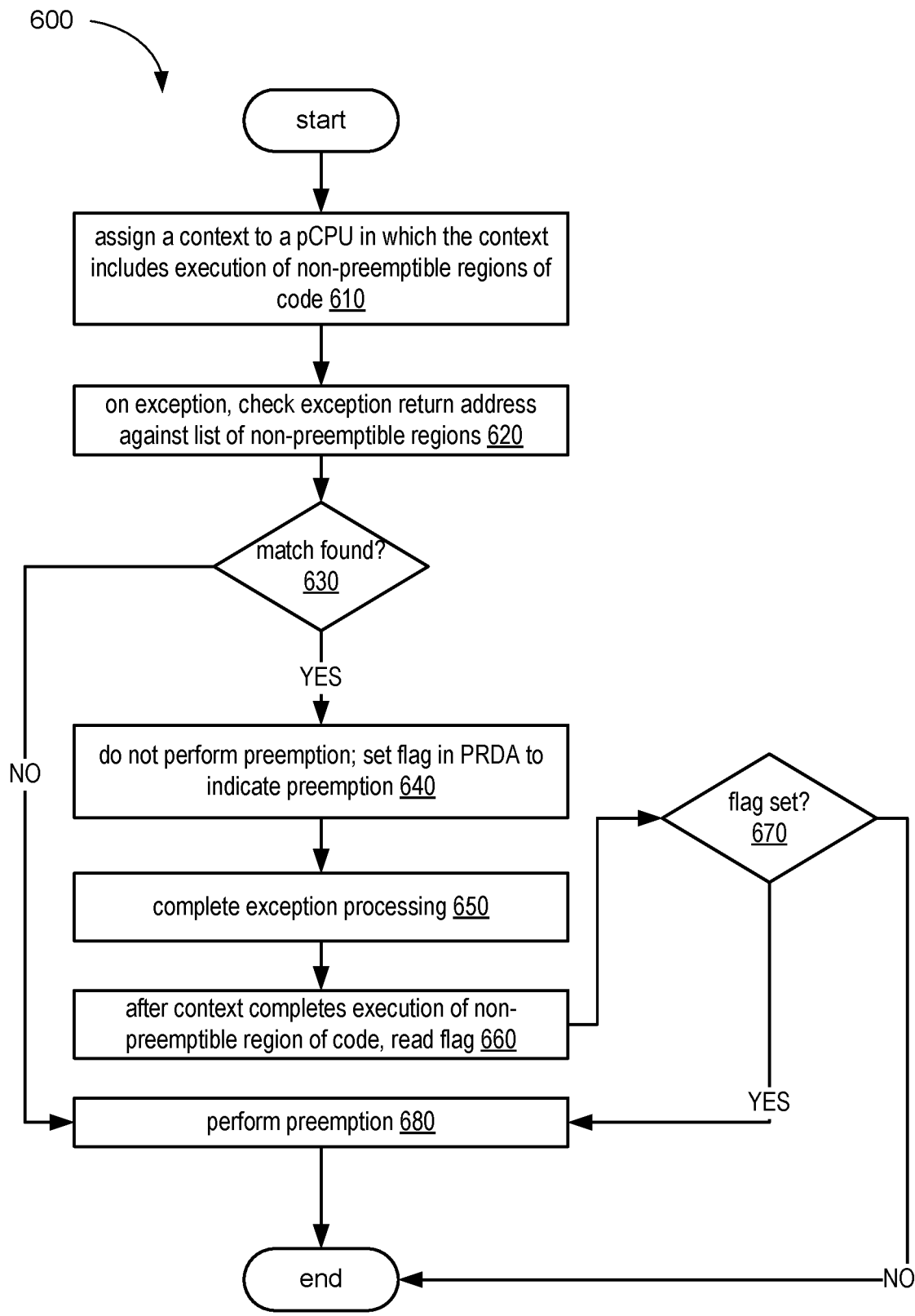
FIG. 6 illustrates a flow diagram of method for assuring safe execution of critical regions of code, according to an embodiment.

FIG. 6 illustrates a flow diagram of method 600 for assuring safe execution of critical regions of code, according to an embodiment. The critical regions of code include areas of code, such as those that involve PRDA access, in which preemption is not allowed. These regions are determined at build or compile time, and a list of the critical regions of code is assembled at boot time based on information provided at build time.

Method 600 begins at step 610, in which a scheduler assigns a context to a pCPU in which the pCPU may execute code in a non-preemptible region.

At step 620, when an exception occurs, the scheduler checks the exception return address to determine whether the pCPU is executing in a non-preemptible region of code. The exception return address is checked against the list of critical regions of code. At step 630, the scheduler determines whether the exception return address matches an address in the list of critical regions of code. If no match is found, flow proceeds to step 680, where the resource scheduler performs the preemption and possible migration.

Otherwise, the resource scheduler proceeds to step 640, where the resource scheduler does not perform the preemption, but instead delays it, and sets a flag in the PRDA of the pCPU to indicate that a preemption is pending. At step 650, the context completes processing of non-preemptible code. At step 660, after the context completes processing the non-preemptible code, the scheduler reads the flag in the PRDA of the pCPU. At step 670, the scheduler determines whether the flag indicating a pending preemption was set. If the flag was set, the scheduler performs a preemption and possible migration of a new context to a different pCPU in step 680. Otherwise, no further action is taken. Thus, method 600 avoids a preemption in a non-preemptible code region.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for assuring safe execution of non-preemptible code, comprising:
    assigning a context to execute on a first central processing unit (CPU);
    receiving an exception and, while processing the exception, determining whether the context is currently executing non-preemptible code;
    if the context is currently executing non-preemptible code, setting a flag indicating that a preemption is pending;
    completing the exception processing on the first CPU;
    completing execution of the non-preemptible code;
    discovering whether the flag is set; and
    if the flag is set, allowing a preemption to move the context to a second CPU.

2. The method of claim 1, wherein determining whether the first CPU is currently executing non-preemptible code includes:
    comparing a return address of the exception to a list of non-preemptible code locations.

3. The method of claim 1,
    wherein the non-preemptible code includes code for accessing a per-CPU private data area (PRDA); and
    wherein the code for accessing the per-CPU PRDA includes obtaining an address of the PRDA, and performing an access of the PRDA using the address.

4. The method of claim 3, wherein the obtaining an address comprises loading the address into a register.

5. The method of claim 4, wherein performing an access of the PRDA includes performing a read or write operation using the address in the register.

6. The method of claim 3, the method further comprising:
 while the context executes on the first CPU, performing an access to a first PRDA belonging to the first CPU; and
 while the context executes on the second CPU, performing an access to a second PRDA belonging to the second CPU, wherein while the context executes on the second CPU, each access to the second PRDA by the context includes using the address in the register.

7. The method of claim 6, wherein the first PRDA is within a first region of a physical memory, the first region being located outside of the first CPU and outside of the second CPU; and
 wherein the second PRDA is within a second region of the physical memory that is different from the first region of the physical memory, the second region being located outside of the first CPU and outside of the second CPU.

8. A non-transitory computer readable medium comprising instructions to be executed in a computer system for a method of assuring a safe execution of non-preemptible code, said method comprising:
 assigning a context to execute on a first central processing unit (CPU);
 receiving an exception and, while processing the exception determining whether the first CPU is currently executing non-preemptible code;
 if the CPU is currently executing non-preemptible code, setting a flag indicating that a preemption is pending;
 completing the exception processing;
 completing execution of the non-preemptible code;
 discovering whether the flag is set; and
 if the flag is set, performing a preemption to move the context to a second CPU.

9. The non-transitory computer readable medium of claim 8, wherein the determining whether the first CPU is currently executing non-preemptible code includes:
 comparing a return address of the exception to a list of non-preemptible code locations.

10. The non-transitory computer readable medium of claim 8,
 wherein the non-preemptible code includes code for accessing a per-CPU private data area (PRDA); and
 wherein the code for accessing the per-CPU PRDA includes obtaining an address of the PRDA, and performing an access of the PRDA using the address.

11. The non-transitory computer readable medium of claim 10,
 wherein the obtaining an address comprises loading the address into a register; and
 wherein performing an access of the PRDA includes performing a read or write operation using the address in the register.

12. The non-transitory computer readable medium of claim 9, the method further comprising:
 while the context executes on the first CPU, performing an access to a first PRDA belonging to the first CPU; and
 while the context executes on the second CPU, performing an access to a second PRDA belonging to the second CPU, wherein while the context executes on the second CPU, each access to the second PRDA by the context includes using the address in the register.

13. The non-transitory computer readable medium of claim 12, wherein the first PRDA is within a first region of a physical memory, the first region being located outside of the first CPU and outside of the second CPU; and
 wherein the second PRDA is within a second region of the physical memory that is different from the first region of the physical memory, the second region being located outside of the first CPU and outside of the second CPU.

14. A computer system comprising:
 at least one processor comprising a first central processing unit (CPU), wherein the at least one processor is programmed to carry out a method for assuring safe execution of non-preemptible code, the method comprising:
 assigning a context to execute on the first CPU;
 receiving an exception and, while processing the exception, determining whether the context is currently executing non-preemptible code;
 if the context is currently executing non-preemptible code, setting a flag indicating that a preemption is pending;
 completing the exception processing on the first CPU;
 completing execution of the non-preemptible code;
 discovering whether the flag is set; and
 if the flag is set, allowing a preemption to move the context to a second CPU.

15. The computer system of claim 14, wherein determining whether the first CPU is currently executing non-preemptible code includes:
 comparing a return address of the exception to a list of non-preemptible code locations.

16. The computer system of claim 14,
 wherein the non-preemptible code includes code for accessing a per-CPU private data area (PRDA); and
 wherein the code for accessing the per-CPU PRDA includes obtaining an address of the PRDA, and performing an access of the PRDA using the address.

17. The computer system of claim 16, wherein the obtaining an address comprises loading the address into a register.

18. The computer system of claim 17, wherein performing an access of the PRDA includes performing a read or write operation using the address in the register.

19. The computer system of claim 16, the method further comprising:
 while the context executes on the first CPU, performing an access to a first PRDA belonging to the first CPU; and
 while the context executes on the second CPU, performing an access to a second PRDA belonging to the second CPU, wherein while the context executes on the second CPU, each access to the second PRDA by the context includes using the address in the register.

20. The computer system of claim 16, wherein the first PRDA is within a first region of a physical memory, the first region being located outside of the first CPU and outside of the second CPU; and
 wherein the second PRDA is within a second region of the physical memory that is different from the first region of the physical memory, the second region being located outside of the first CPU and outside of the second CPU.

* * * * *